United States Patent
Aoyama

Patent Number: 5,226,228
Date of Patent: Jul. 13, 1993

[54] PART FEEDING APPARATUS

[76] Inventor: Yoshitaka Aoyama, 20-11, Makitsukadai 2-cho, Sakai-shi, Osaka 590-01, Japan

[21] Appl. No.: 690,890
[22] PCT Filed: Nov. 15, 1989
[86] PCT No.: PCT/JP89/01166
  § 371 Date: Jun. 18, 1991
  § 102(e) Date: Jun. 18, 1991
[87] PCT Pub. No.: WO91/07339
  PCT Pub. Date: May 30, 1991

[51] Int. Cl.⁵ .............................. B23P 19/00
[52] U.S. Cl. ...................... 29/33 K; 29/813; 414/224; 414/751
[58] Field of Search ............... 29/33 K, 456, 810, 813, 29/DIG. 38, 809; 414/224, 751

[56] References Cited
FOREIGN PATENT DOCUMENTS

| | | |
|---|---|---|
| 44-15954 | 7/1969 | Japan . |
| 0109247 | 9/1976 | Japan . |
| 56-20409 | 5/1981 | Japan . |
| 0164528 | 6/1989 | Japan ................................ 29/813 |

Primary Examiner—Z. R. Bilinsky
Attorney, Agent, or Firm—Nikaido, Marmelstein, Murray & Oram

[57] ABSTRACT

A part feeding apparatus is adapted to hold a part (10) on a holding portion (12) at the front end of a feed rod (11) and feed it to an intended place. A locking portion (14) at the end of a feed tube (7) is disposed in opposed relation to the holding portion (12). The apparatus includes an operating rod (20) adapted to move into the locking portion (14) to transfer a part (10) from the locking portion (14) to the holding portion (12), and the part once positioned at the locking portion (14) is moved to the holding portion (12). Further, a magnet (23) for attracting the part is retractably installed adjacent the holding portion (12) at the front end of the feed rod (11).

8 Claims, 2 Drawing Sheets

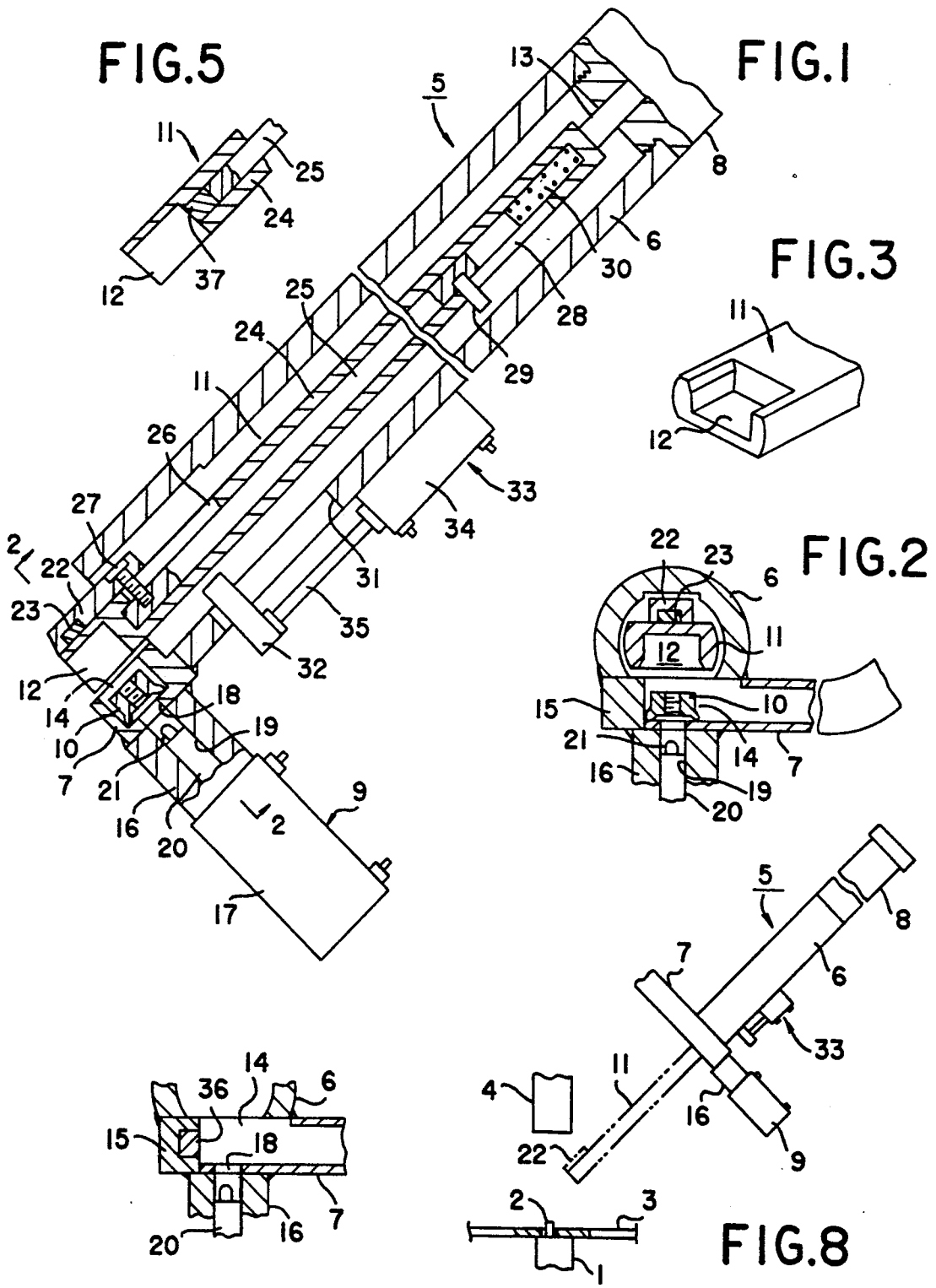

PART FEEDING APPARATUS

TECHNICAL FIELD

This invention relates to an apparatus adapted to hold a part at the front end of a feed rod and feed it to an intended place, said apparatus being utilized in a field where such parts as distance pieces and projection nuts having projections are used.

BACKGROUND ART

As regards an apparatus of the type in which a part is held at the front end of a feed rod and the latter is stroked to an intended place, there is known one in which a part is kept on standby in advance at a predetermined place; a feed rod is advanced during which the feed rod holds the part at its front end and then the feed rod continues advancing. There is also known another in which a part coming in through a part feeding tube is directly moved onto the front end of the feed rod and is held thereon.

In such prior art, there has been a problem that said part cannot be accurately held on the front end of the feed rod. In the former type described above, even if the standby position of the part is slightly deviated from the stroke axis of the feed rod, the correct holding of the part cannot be attained. In the latter type described above, if the front end of the part feeding tube is not correctly positioned with respect to the front end of the feed rod, the part cannot be correctly held. Since the related members are movable relative to each other, it is very difficult to correctly establish the positional relationship described above. Further, holding the part during the stroking of the feed rod or holding the part which has come in with a high momentum results in the part colliding with the front end of the feed rod; in some cases, the part is repulsed.

SUMMARY OF THE INVENTION

The present invention has been presented to solve the above problems. The first embodiment of the invention is an apparatus adapted to hold a part at the front end of a feed rod and feed it to an intended place. The invention is characterized in that a locking portion at the end of a feed tube is disposed in opposed relationship to the holding portion and in that the apparatus includes an operating rod adapted to move into the locking portion to transfer a part from the locking portion to the holding portion. After the part has been positioned at the locking portion at the end of the feed tube end, it is moved to the holding portion at the front end of the feed rod. According to the second embodiment of the invention, a magnet is installed adjacent the holding portion at the front end of the feed rod to make the holding of the part more reliable; said magnet being movable from the holding portion. Thus, when the feed rod is advanced to a predetermined place, the magnet is spaced from the part to release the latter from the front end of the feed rod.

According to the present invention, the front end of the feed rod and the locking portion of the feed tube are put in opposed relationship to each other, and since the operating rod acting on the part in the locking portion is provided, the positioning of the part is effected before the latter is fed into the holding portion of the feed rod. Then, the part is moved into the holding portion by the operating rod. Therefore, by accurately setting the standby position of the part in the holding portion and moving it by the operating rod, the part is reliably fed into the holding portion. As a result, reliable feeding of parts is attained.

Further, since the holding action is effected by conveying the part until the latter is close to the front end of the feed rod, reliable holding is attained without involving the phenomenon of the part being repulsed as described in the Background Art.

BRIEF DESCRIPTION OF THE DRAWINGS

FIG. 1 is a longitudinal sectional side view of the present invention;

FIG. 2 is a sectional view taken along the line 2—2 in FIG. 1;

FIG. 3 is a three-dimensional view of the holding portion;

FIG. 4 is a cross sectional plan view;

FIG. 5 is a longitudinal sectional side view of the present invention;

FIG. 8 is a side view of the present invention; and

BEST MODE FOR CARRYING OUT THE INVENTION

Figure 6:
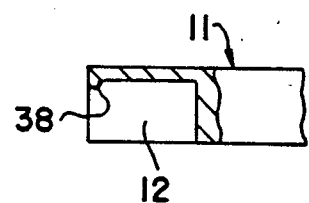
FIGS. 6 and 7 are longitudinal sectional side views of further embodiments of the holding portion.

FIG. 8 is a side view of the present inventive apparatus applied to a spot welding machine. A steel plate part 3 is placed on a fixed electrode 1 with a guide pin 2 extending therethrough. The reference character 4 denotes a movable electrode.

The detailed construction of a feed unit 5 will now be described with reference to FIGS. 1 through 3. A part to be handled in this embodiment is a projection nut (hereinafter referred to as the nut) denoted by 10. The front end of a feed rod 11 is formed with a holding portion 12 for receiving the nut 10. As regards the shape of the holding portion, as shown in FIG. 3, the front end is in the form of an opened box-shaped recess. The feed rod 11 is received in a sleeve 6 and is connected to the piston rod 13 of an air cylinder 8.

The end of the feed tube 7 is formed with a locking portion 14 with one side opened, the opened side being opposed to the holding portion 12 in close proximity thereto, as shown. A stop piece 15 is welded, as shown, to define a stop position for the nut 10. An operating device 9 is joined to the back surface of the feed tube 7 through a distance piece 16, the operating device 9 being any of various forms including an electromagnetic solenoid. In this embodiment, however, an air cylinder 17 is employed. A hole 18 formed in the feed tube 17 communicates with a hole 19 formed in the distance piece 16, and in this state it is coaxial with the threaded opening in the nut 10 in the stop position. An operating rod 20 is slidable in the two holes 18 and 19, and is joined to the piston rod (not shown) of the air cylinder 17. A positioning pin 21 is fixed to the front end of the operating rod 20 and adapted to be moved into the threaded hole of the nut 10.

Figure 9:
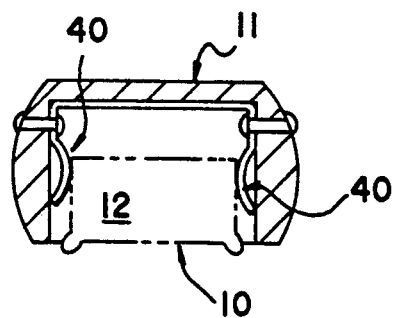
FIG. 9 is a front view of the holding portion illustrating the use of thin plate springs therein.

Various methods may be contemplated for holding the nut 10 in the holding portion 12 of the feed rod, including one method in which a thin plate spring 40 is attached to the opposed inner wall surface of the holding portion 12 to lightly clamp the nut (see FIG. 9) 10. In this embodiment, however, as the simplest example, a magnet is employed. For the magnet, an electromagnet surrounding the feed rod 11 may be used; in this embodiment, however, a permanent magnet is used.

A slider 22 is located in contact with the outer surface of the feed rod 11, and a magnet (permanent magnet) 23 is embedded at a position corresponding to the holding portion 12. The feed rod 11 is of double construction, comprising an outer rod 24 and an inner shaft 25, said outer rod 24 being formed with an elongated opening 26 extending in the stroke direction, with a bolt 27 extending through the elongated opening 26 to integrate the slider 22 and inner shaft 25.

The upper region of the feed rod 11 is also formed with an elongated opening 28 extending in the stroke direction and a control pin 29 fixed to the inner shaft 25 projects therethrough, as shown. A coil spring 30 is interposed between the inner shaft 25 and the outer rod 24, and its elastic force is supported in that the control in 29 abuts against the lower end of the elongated opening 28.

The lower region of the sleeve 6 is formed with an elongated opening 31 extending in the stroke direction, and a locking element 32 extends therethrough from the outside. A driving device 33 attached to the outer surface of the sleeve 6 is in the form of an air cylinder 34 and its piston rod 35 is joined to the locking element 32. The relative positions of the locking element 32 and control pin 29 are disposed on an imaginary axis and are such that when the feed rod 11 is stroked by a predetermined amount, the two are in close proximity.

Figure 7:
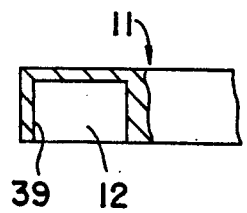

In addition, to cause the magnetic force of the magnet 23 to act of the nut 10 strongly, it is preferable that the outer rod 24, inner shaft 25 and slider 22 be made of stainless steel. Further, in this embodiment, the feed unit 5 is inclined in its entirety so that the holding portion 12 is opened obliquely to the lower right. As shown in FIGS. 1 and 8, the operating rod 20 is thus able to move to the upper left. However, as in understood from the following description of operation, it is also possible to horizontally install the feed unit 5 and vertically advance and retract the operating rod 20 and open the holding portion 12 immediately downward. Further, if there is the danger of the nut 10 flying under inertia out of the holding portion 12, it is preferable to provide a deviation preventing projection 38 as shown in FIG. 6 or a wall plate 39 as shown in FIG. 7.

FIG. 2 shows the state in which the nut 10 has arrived at the locking portion 14 through the feed tube and received by the stop piece 15, the nut 10 being placed in opposed relation to the recess of the holding portion 12. When the operating rod 20 is advanced by the air cylinder 17, the positioning pin 21 is advanced into the threaded opening in the nut 10 to push the latter out and into the holding portion 12, where the nut 10 is temporarily locked by the magnet 23. Thereafter, when the operating rod 11 alone is restored to its original position, the feed rod 11 is advanced by the output of the air cylinder. At this time, it is advanced with the relative positions of the magnet 23 and holding portion 12 (i.e., nut 10) remaining unchanged. When the nut 10 reaches the intended place, the feed rod 11 is stopped. At this time, the control pin 29 is in close proximity to the locking piece 32, and the air cylinder 34 is contracted, whereby the magnet 23 is forcibly pulled up successively through the structure of the locking element 32, control pin 29, inner shaft 25, bolt 27 and slider 22. With the air cylinder 34 contracted, the magnet 23 is thereby spaced from the nut 10, such that the attractive force on the nut 10 substantially disappears. Therefore, the nut 10 is released from the held state and aligned with the guide pin 2 shown in FIG. 8.

In FIG. 4, a magnet (permanent magnet) 36 is embedded in the stop piece 15 to increase the static stability of the nut 10. In FIG. 5, a magnet 37 acting on the nut 10 in the holding portion 12 is fixed to the front end of the inner shaft 25.

What is claimed is:

1. A part feeding apparatus, comprising:
 a feed rod having an outer shaft and an inner shaft wherein the inner shaft is slidably engaged with the outer shaft, the outer shaft including an elongated opening defined parallel to the length of said feed rod, the inner shaft including a control pin mounted so as to slidably engage with the elongated opening of the outer shaft, and the outer shaft further having a spring positioned within the outer shaft between inner ends of the outer and inner shafts;
 a sleeve in which said feed rod is slidably mounted, said sleeve having an elongated opening defined on an outer surface thereof and parallel to a length of said sleeve;
 driving means located adjacent said sleeve, for driving a locking element operatively connected to a driving end thereof slidably along the elongated opening of said sleeve, the locking element being formed and positioned in the elongated opening so as to slidably travel along an axis along which the control pin of the inner shaft of said feed rod travels when said feed rod operatively slides in and out of said sleeve, said driving means being further for driving the locking element so as to contact the control pin and thereby retract the inner shaft relative to the outer shaft when said feed rod is extended from said sleeve;
 motive means operatively connected to the inner end of said feed rod so as to slidably extend and retract said feed rod relative to said sleeve;
 holding means mounted on an outer end portion of the inner shaft extending out of an outer end of said feed rod, for receiving and holding a part to be transported, said holding means being mounted on the inner shaft so as to be retracted when the inner shaft is retracted by the locking element of said driving means thereby releasing the part to be transported;
 part feeding means located adjacent said holding means, for feeding parts to be transported such that said holding means can receive a part to be transported, said part feeding means having a locking portion located adjacent said holding means for positioning a part to be received by said holding means; and
 part transfer means operatively connected to the locking portion of said part feeding means, for transferring the part from the locking portion to said holding means.

2. A part feeding apparatus according to claim 1, wherein said holding means includes a box-shaped recess formed to receive the part to be transported.

3. A part feeding apparatus according to claim 2, wherein said holding means includes a plate spring attached to an inner wall portion of the box-shaped recess for clamping the part to be transported to said holding means.

4. A part feeding apparatus according to claim 1, wherein said holding means includes a magnet for holding the part to be transported.

5. A part feeding apparatus according to claim 1, wherein part transfer means includes an electromagnetic solenoid.

6. A part feeding apparatus according to claim 1, wherein part transfer means includes an air cylinder.

7. A part feeding apparatus according to claim 1, wherein the locking portion of said part feeding means includes a magnet for locking a part to be received by said holding means in position prior to being transferred by said part transfer means.

8. A part feeding apparatus according to claim 2, wherein said holding means includes a magnet for holding the part to be transported, the magnet being positioned at an outer end of the inner shaft along an inner wall portion of the box-shaped recess.

* * * * *